United States Patent [19]

Miller

[11] Patent Number: 4,683,516
[45] Date of Patent: Jul. 28, 1987

[54] EXTENDED LIFE CAPACITOR AND METHOD

[75] Inventor: John R. Miller, Shaker Heights, Ohio

[73] Assignee: Kennecott Corporation, Cleveland, Ohio

[21] Appl. No.: 894,673

[22] Filed: Aug. 8, 1986

[51] Int. Cl.⁴ .......................... H01G 4/38; H01G 9/00
[52] U.S. Cl. ..................................... 361/328; 361/433
[58] Field of Search ...................... 29/25.42; 361/4.33, 361/328, 329

[56] References Cited

U.S. PATENT DOCUMENTS

| | | |
|---|---|---|
| 2,733,389 | 1/1956 | Ellison ................................. 361/433 |
| 3,196,323 | 7/1965 | Rogers et al. ........................ 361/433 |
| 3,536,963 | 10/1970 | Boos .................................... 361/433 |
| 3,634,736 | 1/1972 | Boos et al. .......................... 361/433 |
| 3,656,027 | 4/1972 | Isley .................................... 361/433 |
| 4,014,730 | 3/1977 | Selover, Jr. et al. ................ 156/331 |
| 4,479,168 | 10/1984 | Green, Jr. ............................ 361/433 |
| 4,523,255 | 1/1985 | Rogers ................................. 361/433 |
| 4,538,212 | 8/1985 | Montgomery ....................... 361/433 |
| 4,542,444 | 9/1985 | Boland ................................. 361/433 |

FOREIGN PATENT DOCUMENTS 601109  4/1948  United Kingdom ................ 361/328

Primary Examiner—Donald A. Griffin
Attorney, Agent, or Firm—H. M. Snyder; G. R. Plotecher

[57] ABSTRACT

An extended life capacitor is disclosed in which an enclosing body is made from a tantalum can and tantalum cap and enclosing a plurality of double layer capacitor cells. Each of the capacitor cells includes a conductive material, such as activated carbon, with an aqueous electrolyte therein such as dilute sulfuric acid. In the preferred embodiment, this is about 38% by weight of sulfuric acid, and the remainder water. Lead-ins are provided to make electronic connection to the two ends of the capacitor cell stack as anode and cathode electrodes. The entire unit is hermetically sealed to inhibit the loss of electrolyte from the capacitor body to less than 2% per year, and the electrodes are at least partly coated with a noble metal such as gold to limit the establishment of a spurious capacitor which would be in series with the stack of plurality cells, which would otherwise greatly decrease the capacity of the entire unit.

28 Claims, 10 Drawing Figures

EXTENDED LIFE CAPACITOR AND METHOD

BACKGROUND OF THE INVENTION

Two different metals have been used extensively in electrolytic capacitors, namely aluminum and tantalum. These electrolytic capacitors are generally used in the filter sections of power supplies and other locations where high capacity is required. Because of their low price, aluminum electrolytics are extensively used. Tantalum capacitors often exhibit higher values of capacity per-unit-volume than aluminum types, but are often more expensive per microfarad. A totally different type of capacitor, called a "double layer capacitor," has even higher capacities per-unit-volume. The wet slug type tantalum capacitor is produced in ratings up to about 1200 microfarads. Double layer capacitors have been produced for commercial uses and these include high capacitance (up to 1,000,000 microfarads or larger) low voltage designs which consist essentially of a pair of paste electrodes and a separator saturated with electrolyte to form a capacitor cell. The past electrodes are from a conductive material, such as both being carbon, as in U.S. Pat. No. 3,536,963, or one of the paste electrodes being of carbon and the other being of a refractory hard boron carbide or the like, as shown in U.S. Pat. No. 3,634,736. Other double layer capacitor cells are disclosed in U.S. Pat. Nos. 3,656,027; 4,014,730; and 4,542,444, hereby incorporated by reference. These devices utilize a carbon paste electrode which is manufactured by mixing finely divided carbon particles with an electrolyte to form a paste and then subsequently forming an electrode from the paste. Activated carbon may be utilized because it has a high surface area to achieve a high farad capacity per-unit-volume of the entire capacitor.

The tantalum wet slug capacitors do not utilize the double layer capacitor cell construction. Instead, they are of essentially a single capacitor construction, with a central anode of porous tantalum and the electrolyte is generally of a sulfuric acid type. The tantalum can becomes the cathode, utilizing not only the base of the can but also the inner surface of the usual cylindrical-shaped can. In this type, the tantalum can is always the cathode and serves an electrochemical purpose, forming a capacitor between the tantalum metal surface and the electrolyte. To this end, the inner tantalum surface is roughened to increase the surface area and often may have a porous layer thereon, such as disclosed in U.S. Pat. No. 4,523,255.

The typical wet slug capacitor has extremely limited reverse voltage capability. Reverse voltage on a typical wet slug tantalum capacitor can disintegrate the usual tantalum oxide layer on the anode, and if any other metal is present, such as silver, this can plate out as dendrites on the anode. If these become long enough, they can touch the closely adjacent cathode, and then when the proper polarity of voltage is applied, these can cause a short-circuit, with consequent high current, rapid heating, and catastrophic failure such as fire or explosion.

The double layer capacitor cell type is considerably different from the wet slug tantalum capacitor. In the former, the capacitor is non-polar, whereas in the wet slug tantalum capacitor, the can is always the cathode. In the double layer capacitor, the container serves no electrochemical purpose; in the wet slug it does serve an electrochemical purpose, being in the path of the flow of electrons into and out of the capacitor. In the double layer capacitor, the container surface need be electronically conductive only at the electrode connection, whereas, in the wet slug the tantalum surface in some cases is electronically insulating, as in the porous cathode configurations. In the double layer, a smooth inner surface is satisfactory, whereas in the wet slug a rough inner surface is desirable in order to increase the surface area and the capacitance. In the double layer, an applied reverse voltage causes no problems, since it is non-polar, taking a charge equally well in either polarity, whereas the wet slug tantalum devices have a very limited reverse voltage range.

The double layer devices also have in the order of 100 to 1000 times more farad capacity per-unit-volume than the wet slug tantalum devices, and hence are even used as an uninterruptible power supply for as much as a week. That is, the technology of the wet slug tantalum capacitors is not applicable to provide the same back-up service as the double layer capacitors.

The presently available double layer capacitors have a number of deficiencies which limit their usefulness, life, and applications, including: a limited operating temperature of $-25°$ C. to $+70°$ C.; corrosion of the container; inability to perform adequately in a high vacuum or high humidity; and limited service life of loss of up to 15% of capacitance when operated for less than two months at 70° C.

There is a considerable need for an extended life, double layer capacitor, especially in military applications, where a device must work properly even though in storage for 20 or 25 years and/or monitored at elevated temperatures. It has been determined that commercial devices over a number of years and under adverse conditions will lose some of the electrolyte. This has two damaging results: the drying out of the paste electrodes to reduce the farad capacity of the unit, and the considerable increase in the equivalent series resistance. This resistance increase is due to a higher concentration and reduction in quantity of the acid electrolyte and internal contact resistance due to corrosion.

SUMMARY OF THE INVENTION

Accordingly, the problem to be solved is how to construct a capacitor of high farad capacity in a small unit volume, and yet one with an extended life which resists corrosion, resists increased equivalent series resistance, and resists electrolyte loss.

The problem is substantially solved by this invention, which includes an extended life capacitor comprising, in combination, an enclosing body, a plurality of double layer capacitor cells inside said enclosing body and having first and second electron-conducting end members, said plurality of capacitor cells including a conductive material with an electrolyte therein, means providing electrical connection external to said body, mutually insulated, to said first and second end members of said plurality of capacitor cells as anode and cathode, means to inhibit the loss of electrolyte from the interior to the exterior of said capacitor body and said inhibiting means including a body the interior surface of which is formed from a material highly resistant to corrosion by said electrolyte.

One embodiment of this invention includes an extended life capacitor comprising, in combination, a hollow body having an inner peripheral surface of tantalum and having an open end and a closed end base with at least a portion of an inner surface of a noble metal, a cap cooperable with the open end of said body and having an inner surface of tantalum, a lead-in through said cap and hermetically sealed thereto in an insulated manner, an electrode insulated from and disposed inside said cap and connected to said lead-in, a plurality of individual capacitor cells in a stack inside said body, said electrode having at least a portion of a face of a noble metal in electron conduction with one end of said stack, the other end of said stack being in electron conduction with said closed end base, a welded connection between said cap and said body to establish a hermetically sealed capacitor, and said capacitor cells including conductive material with electrolyte therein containing about 36-40% by weight sulfuric acid whereby the hermetic sealing and high purity of the components plus the noble metal assure a service life in excess of 10 years at a temperature range of $-55°$ C. to $+125°$ C.

The problem is still further solved by the method of producing an extended life capacitor comprising supplying a tantalum can with a hollow body having a closed end base and an opening at one end, plating the interior of the base which acts as an electrode, inserting a plurality of capacitor cells in the body in such a manner that they are electrically in series, each of said cells containing electrolyte, preparing a tantalum cover for the opening in the cylindrical body having a hermetically sealed feed-through therein, assembling an electrode in an insulated manner inside the tantalum cover with a lead for the electrode passing through the feed-through, pressing the cover on the can with a predetermined force to compress the capacitor cells for good electrical conductivity, and sealing the cover to the can to establish a hermetically sealed capacitor can whereby a capacitor is assembled which loses less than 2% per year of electrolyte.

An important feature of the invention is to utilize double layer capacitor cells inside an enclosing body. These double layer capacitor cells have 100-1000 times as much farad capacity as wet slug tantalum capacitors, so that they are much more efficient in capacity per-unit-volume. Each of these capacitor cells includes conductive material, often of powder, such as activated carbon, with an electrolyte. The electrolyte may be an aqueous electrolyte of the mineral acid type, such as sulfuric acid. The sulfuric acid is diluted, preferably in the range of 36-40% sulfuric acid, and the rest is water. The activated carbon is preferably of high purity, as used in the double layer cell. Several metals are typically found in activated carbon. Metals such as iron, copper, molybdenum, and vanadium are preferably present in amounts less than about 500 ppm, and more preferably less than about 200 ppm, for an extended life without excessive leakage current, but will aslo work with less purity. The leakage resistance is effectively in parallel with the capacitor cells, so it is desired to keep this at a maximum throughout the service life of the capacitor. The enclosing body is hermetically sealed and made from tantalum or tantalum alloy to serve both as corrosion protection and as a conductor to one of the electrodes.

Another feature of the invention is that the external tantalum can may be either the cathode or the anode, because reverse polarity is easily accepted in this capacitor unit. The enclosing body is made from a tantalum can in the preferred embodiment, with a cup-shaped cap, also of tantalum, and with a lead-in extending in an insulated manner through this cap. An electrode such as an anode is a disc-shaped anode supported in an insulated manner just inside the cap. A plurality of double layer capacitor cells are mounted in a stack inside the body and are in electron conducting communication with the adjacent surface of the anode electrode, which preferably is coated with a noble metal such as gold. The closed end base of the can serves as the other electrode, such as the cathode, and it also is coated with a noble metal such as gold for electron communication with the adjacent end of the stack. The gold coating on the anode and cathode serves the dual purpose of eliminating corrosion and also eliminating the formation of a spurious capacitor due to the electrolytic action of the electrolyte. If a spurious capacitor were to be formed, it would be in series with the plurality of capacitor cells, and since the capacitive reactance is equal to the sum of the reciprocals of the individual capacitors in series, the capacitive reactance would be greatly increased, to the detriment of the value and service life of the entire capacitor.

At least a portion of each electrode is preferably coated with a noble metal, in order to provide a good electrical contact to the respective end of the stack. If any spurious capacitance should grow, as due to electrolytic action, on either electrode, it would be shorted by the noble metal coating to be rendered harmless.

The superior results are: long life, e.g, 25 years, high tolerance to temperature, minimal increase in leakage current, minimal increase in equivalent series resistance, minimal corrosion, and meeting military requirements for vibration and shock resistance.

Other objects and a fuller understanding of the invention may be had by referring to the following description and claims, taken in conjunction with the accompanying drawing.

DESCRIPTION OF THE PREFERRED EMBODIMENTS

FIGS. 1-4 illustrate the problems of the prior art, including weight loss, loss of capacitance, and dramatic increase of equivalent series resistance, all problems solved by the novel present invention described below.

Figure 5:
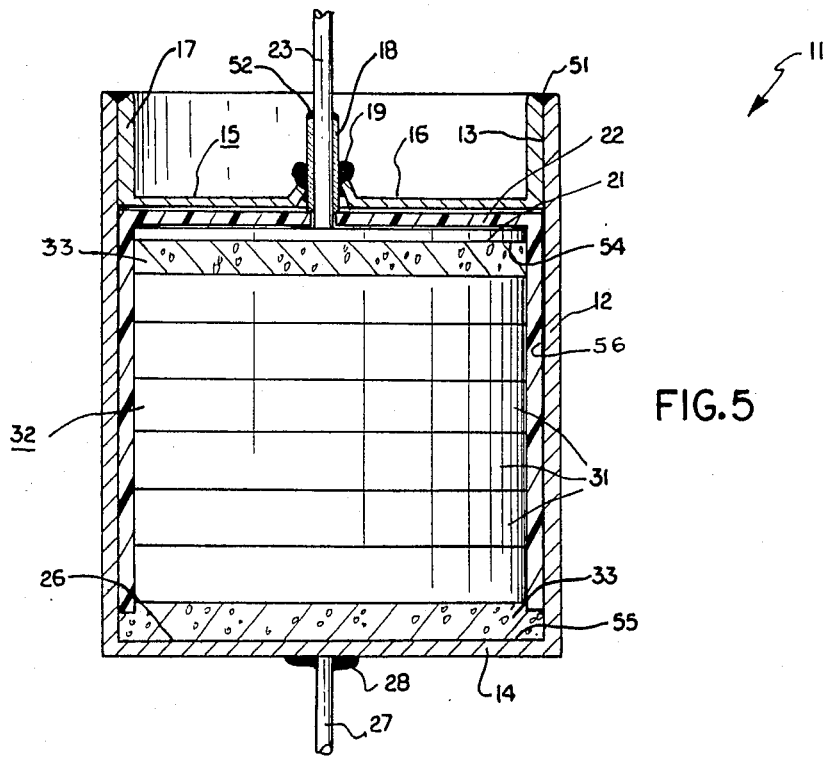
FIG. 5 is a cross-sectional view of a capacitor embodying the present invention.

FIG. 5 illustrates a longitudinal, sectional view through a capacitor unit of the present invention, which is of an extended life capacitor 11. This capacitor is in a hollow body or can 12. At least the interior surface of the container should be of material highly corrosion-resistant to the electrolyte, such as noble metals, titanium, columbium in addition to tantalum, and alloys of these metals such as tantalum and columbium. The hollow body in this embodiment is generally cylindrical, of tantalum, with an open end 13 and a closed end base 14. The enclosure for the capacitor unit 11 further includes a cap 15 which is cooperable with the open end 13 of the body 12. This cap is generally cup-shaped, with a base 16 and a peripheral side wall 17. The peripheral wall 17 is slidable inside the open end 13 of the body 12. The cap 15 includes a hollow feed-through 18, also preferably of tantalum, and a glass-to-metal seal 19 between this coaxial feed-through and the base 16 of the cap. A disc-shaped electrode 21, preferably of tantalum, is disposed inside the capacitor unit and electronically insulated from the cap 15 by a cup insulator 22. A lead-in 23, also preferably of tantalum, at least at the lower portion thereof, is secured to the center of the electrode 21, for example, by welding.

The base 14 of the body 12 serves as a second electrode 26, and since this is preferably of tantalum metal, electronic conduction occurs through this base to an external connection or wire lead 27 secured as by welding 28 to the exterior surface of the base 14. This wire lead may be of any suitable material, such as nickel.

A plurality of double layer capacitor cells 31 are provided in a stack 32 inside the enclosing body 12. Each of these capacitor cells is an individual capacitor, and six are shown in the stack in FIG. 5. All of these capacitor cells are connected in series and by an optional conductive sponge, such as a nickel sponge 33, at each end of the stack, so as to provide electron conduction from each end of the stack to the respective electrodes 21 and 26.

The conductive sponge 33 helps the entire unit 11 withstand severe vibration by absorbing such vibratory stress. The thickness of the nickel sponge permits the unit to be tuned to a particular vibratory frequency to damp the vibrations and their damaging action on the capacitor unit.

Figure 6:
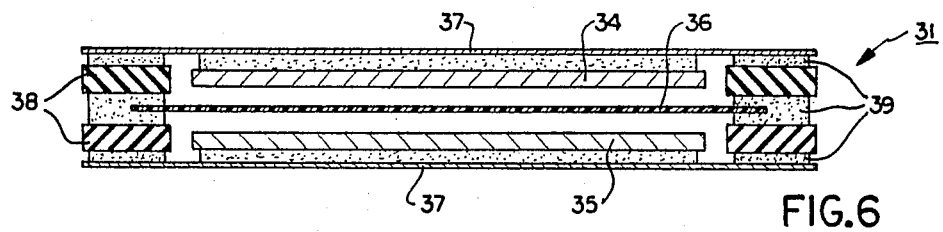
FIG. 6 is a cross-sectional view of one of the capacitor cells in the capacitor unit.

FIG. 6 illustrates a typical construction for one of the capacitor cells 31, and each is substantially identical. These capacitor cells may be as constructed in U.S. Pat. Nos. 3,536,963; 3,634,736; 3,656,027; 4,014,730; or 4,542,444, which are incorporated herein by reference. More in detail, the capacitor cell includes a pair of electrodes 34 and 35 which are made from a conductive powder, such as activated carbon, or in some cases from powdered carbide. The powder is mixed with an electrolyte to form a paste and then formed into the disc-shaped electrodes. The electrolyte is preferably an aqueous electrolyte of the mineral acid type, and preferably dilute sulfuric acid. However, it is only necessary that it contain ion constituents that can conduct electricity. A separator 36 is electron insulating and ion conducting, for example having micropores therein or, in some cases, being an ion exchange membrane. The capacitor cell 31 further includes electron conducting members 37 which are ion insulating. Washer-shaped gaskets 38 are provided at each periphery of the electrodes 34 and 35, and are insulating material flexible to accomodate expansion and contraction of the electrode and flexing of the cell. These gaskets and the electrodes are secured by an adhesive 39 so that the capacitor cell 31 becomes one integral mass and may be readily handled for manufacture and assembly. The function of the gasket and adhesive 39 is to secure the mass of the paste electrodes 34 and 35 inside the cell. The separator 36 may be a polyethylene or polypropylene material, but is preferably a polysulfone which will withstand 125° C. temperatures, a maximum temperature range for the present capacitor. The conductive powder from which the electrodes 34 and 35 are made is preferably of activated carbon particles which have voids therein to increase the total effective surface area to be in the range of 100–2000 square meters per gram. This activated carbon is of high purity, having impurities principally of iron of less than about 200 parts per million, which is in excess of 99.99 percent pure carbon. The sulfuric acid, which is the preferred electrolyte, is in the range of 25% to 76% by weight of sulfuric acid, to provide operation down to −25° C. or, alternatively, in the range of 36% to 40% by weight of sulfuric acid, the remainder being water. The higher concentration of acid gives a higher boiling point, for improved high temperature range. The preferred concentration of sulfuric acid is 38% which provides a temperature range of −55° C. to +125° C.

Figure 8:
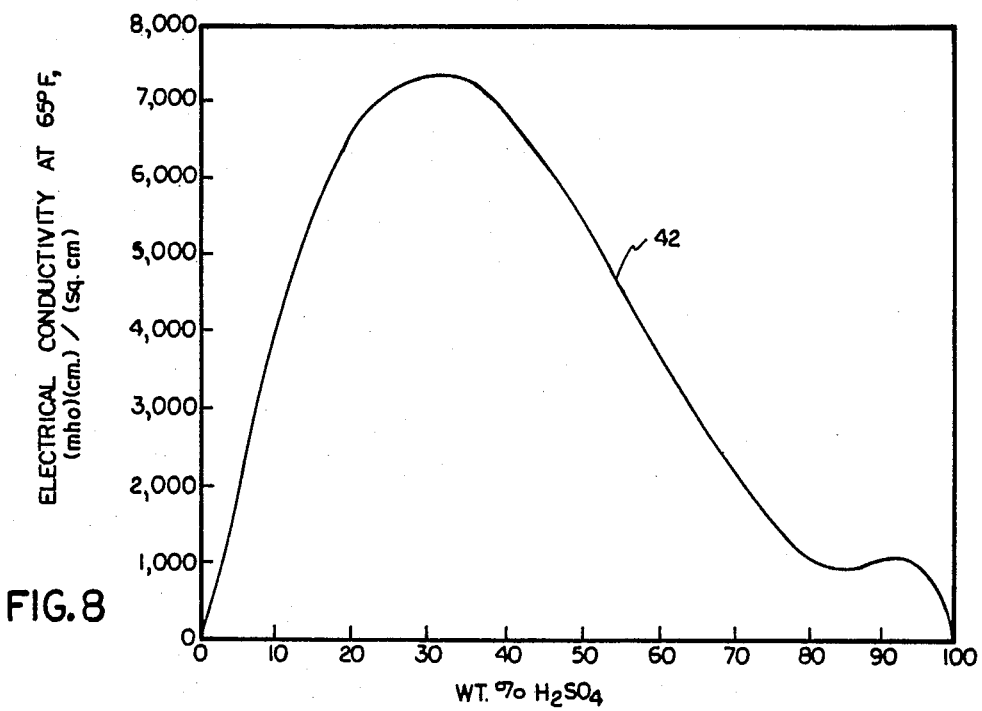
FIG. 8 is a graph of electrical conductivity versus concentration of the electrolyte.

FIG. 8 shows a graph of electrical conductivity versus concentration of the sulfuric acid and the curve 42 illustrates that the electrical conductivity peaks at about 32% by weight of sulfuric acid in the electrolyte. The range of 36% to 40% is still very high in conductivity, being about 7000 mho centimeters per square centimeter.

Figure 9:
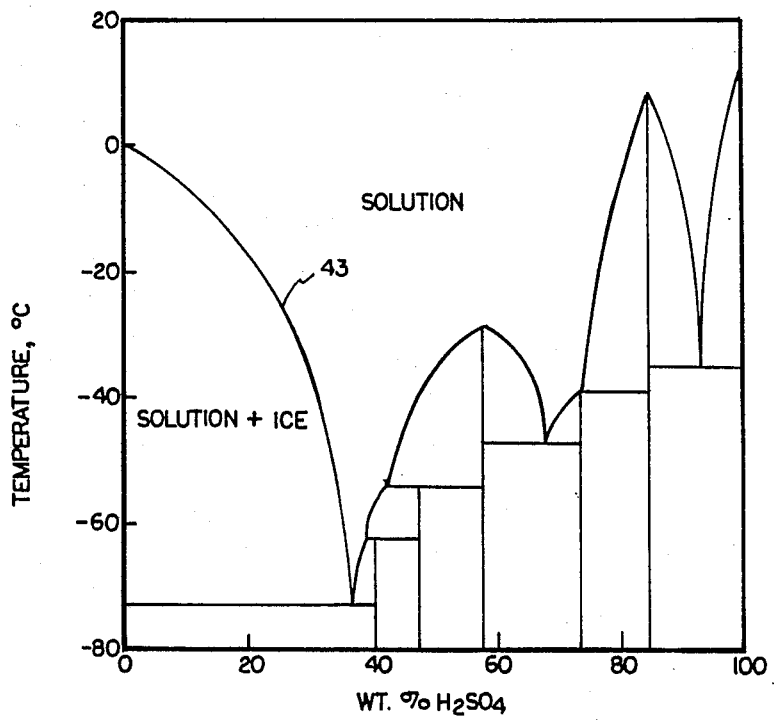
FIG. 9 is a graph of temperature versus concentration of the electrolyte.

FIG. 9 illustrates a graph of temperatures versus concentration of the acid electrolyte, and shows a curve 43. This curve 43 shows a eutectic point at about 38%, which is the preferred concentration of the acid, and the range of 36% to 40% is still a liquid at −60° C. for an extended temperature range for this capacitor unit 11.

Table 1 shows electrical performance of the capacitor unit 11, as compared with the electrolyte concentration. This illustrates that the concentration of 38% by weight of acid is generally superior throughout a wide temperature range for the three criteria of equivalent series resistance, capacitance, and leakage current.

TABLE 1

Electrical Performance vs. Electrolyte Concentration

| Sulfuric Acid Concentration Weight/% | −55° C. | | | −25° C. | | | 25° C. | | | 70° C. | | | 100° C. | | | 125° C. | | |
|---|---|---|---|---|---|---|---|---|---|---|---|---|---|---|---|---|---|---|
| | ESR | C | I | ESR | C | I | ESR | C | I | ESR | C | I | ESR | C | I | ESR | C | I |
| 5 | >1000 | 0 | <.01 | >1000 | 0 | .02 | 6 | .165 | .9 | 6 | .199 | 5.3 | 7 | .226 | 17.0 | 7 | .237 | 38.3 |
| 25 | 50 | .079 | <.01 | 10 | .120 | .18 | 4 | .161 | 1.3 | 4 | .189 | 6.0 | 5 | .216 | 35.0 | 5 | .230 | 216 |
| 38 | 22 | .093 | <.01 | 9 | .116 | .13 | 4 | .154 | .9 | 5 | .187 | 6.0 | 5 | .206 | 90.6 | 8 | .185 | 472 |
| 55 | 141 | .066 | <.01 | 10 | .114 | .07 | 5 | .146 | .6 | 5 | .176 | 20.1 | 7 | .169 | 258 | 8 | .161 | 707 |
| 70 | >1000 | 0 | <.01 | 12 | .089 | .09 | 6 | .116 | .7 | 6 | .140 | 23.3 | 7 | .130 | 258 | 9 | .133 | 728 |

ESR - equivalent series resistance (ohms)
C - capacitance (farads)
I - leakage current (microamperes)

Figure 10:
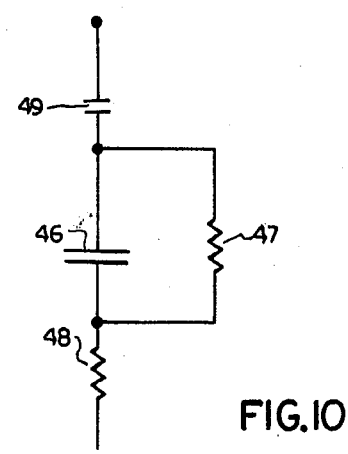
FIG. 10 is a schematic diagram of the equivalent circuit of the capacitor unit.

FIG. 10 illustrates the equivalent circuit of the entire capacitor unit 11, with the capacitor 46 being the entire farad capacity of the plurality of capacitor cells, resistor 47 being the effective leakage resistance, and the resistor 48 being the effective series resistance, or ESR, of the entire capacitor unit 11. This ESR is effective resistance in series with the capacitor unit which resists the flow of current and the electrical conductivity of the electrolyte adversely affects this ESR. This ESR is also controlled by the resistance of the conductive powder in the paste electrodes 34 and 35, in this preferred embodiment activated carbon. It is also affected by all of the series connections from one external lead 23 to the other 27. A spurious capacitor 49 may also appear by the electrolytic action of the electrolyte coacting with either of the anode or cathode electrodes. If such electrolytic action occurs, this can be quite damaging to the life of the capacitor unit 11, because it will be of small microfarad capacity relative to the farad capacity of the series capacitor cells 31. Since it is in series and of small microfarad capacity, the capacitive reactance, being proportional to the sum of the reciprocals of all the capacitance units in series, will be quite high. This will greatly reduce the value of the capacitor unit 11.

In the present invention, there are considerable measures taken to limit the existence and growth of such spurious capacitor 49. They include two important distinctions over the prior art, namely, a means to inhibit the loss of electrolyte from the interior to the exterior of the capacitor body to less than 2% per year, and perhaps to less than 1%, and a means to limit the establishment of spurious capacitive means in series with the capacitor cells 31, so that the total farad capacity decreases less than 2% per year. The inhibiting means includes weld metal 51 welding together the open end 13 of the body 12 and the peripheral wall 17 of the cap 15. It also includes the glass-to-metal seal 19 and weld metal 52 welding the lead-in 23 to the feed-through 18, and thus achieving a hermetically sealed capacitor unit 11. With this hermetic sealing and the use of a highly corrosion-resistant body 12 and cap 15, the electrolyte, and especially the water therein, does not permeate out through the enclosing body, and hence this effectively inhibits loss of electrolyte to less than 2% per year.

The means to limit the establishment of a spurious capacitor 49 includes a noble metal, preferably gold surface 54 (FIG. 5), on the face of the electrode 21 which faces the stack 32. Also, a noble metal, preferably gold, surface 55 is provided on the electrode 26. Each of these gold surfaces 54 and 55 may be plated on their respective electrodes, or may be formed thereon by other suitable means. The inner peripheral wall 56 of the hollow body 12, which in this embodiment is shown as being generally cylindrical, is generally smooth, not rough as in the prior art wet slug tantalum capacitor units. This peripheral wall surface may also be coated with gold if this is easier for manufacture, although since this peripheral wall does not enter into the electron conducting path, except at the lower conducting sponge 33, it is not necessary that this wall be coated with gold.

The tantalum metal is very reactive with oxygen and quickly forms an oxide film which is tough and adherent. Thus, if any pinholes should occur in the gold coating, a tantalum oxide film will quickly form which is self-limiting, since it is an insulator rather than an electron conductor. The gold surfaces 54 and 55 on the two electrodes, which may be anode and cathode, or cathode and anode, effectively prevent the formation of the spurious capacitance 49, which would adversely affect the capacitive reactance, causing it to increase dramatically. This gold coating also provides good electron conduction from the respective anode or cathode through the nickel sponge to the two ends of the capacitor cell stack 32.

Figure 7:
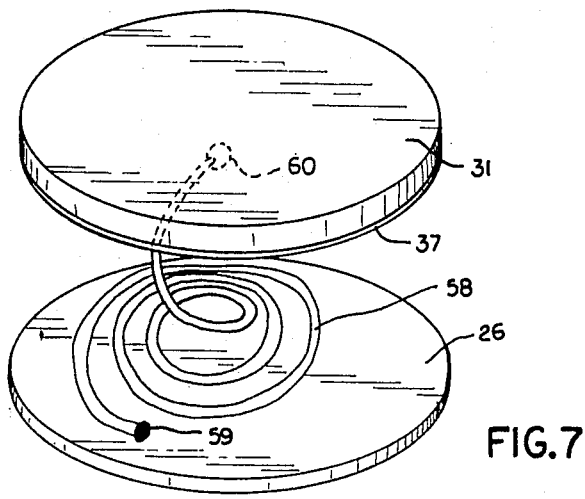
FIG. 7 is a perspective view of the lower end of the capacitor body, showing a second embodiment.

FIG. 7 illustrates an alternative embodiment, showing in perspective the lower end of the body 12. A flexible lead 58 is secured as by welding 59 to the electrode 26, and then curled inside the body 12, for example, buried in the nickel sponge 33, and with the other end connected as by welding or conductive cement 60 to the bottom electron conducting member 37 of the lowermost cell 31 in the stack 32. The length of this flexible lead 58 permits assembly of the stack into the body 12.

So long as at least part of each electrode face has the plating or clad of noble metal, then if a tantalum oxide layer forms on the remainder of that electrode to form a spurious capacitor, it will be effectively short-circuited by the low resistance electron conducting path afforded by the noble metal. As a result, this will limit the establishment of a spurious capacitor in series with the capacitor cells 31. The same result is achieved by the alternative flexible lead 58 of FIG. 7, described below.

Figure 1:
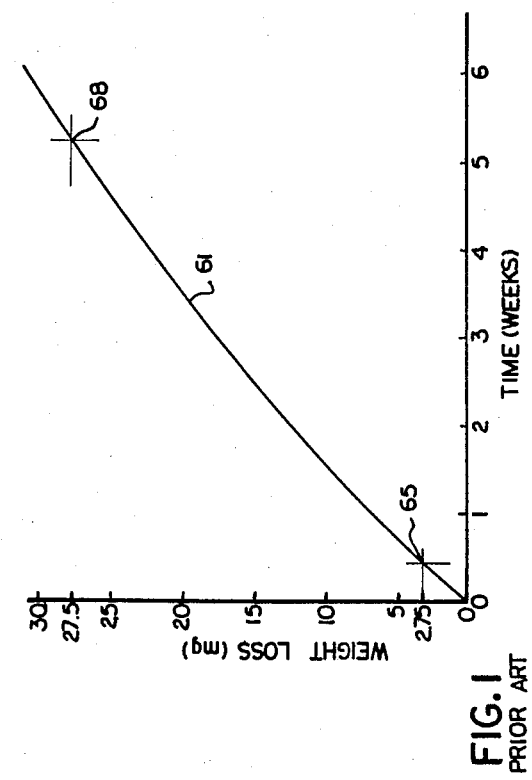
FIGS. 1, 2, 3, and 4 are graphs of performance of the prior art double layer capacitors under accelerated life test conditions.

FIGS. 1–4 illustrate results of an accelerated life test on the prior art double layer capacitor-type units. Such commercial units were not hermetically sealed, and were rated at a maximum of 70° C. Operation at 85° C. in FIG. 1 shows a curve 61 of weight loss versus time of operation in weeks while operating at 5.5 volts. This showed a considerable weight loss in milligrams. Such units had a total electrolyte of about 55 milligrams, of which about 15 milligrams was $H_2SO_4$ at 96%.

Figure 2:
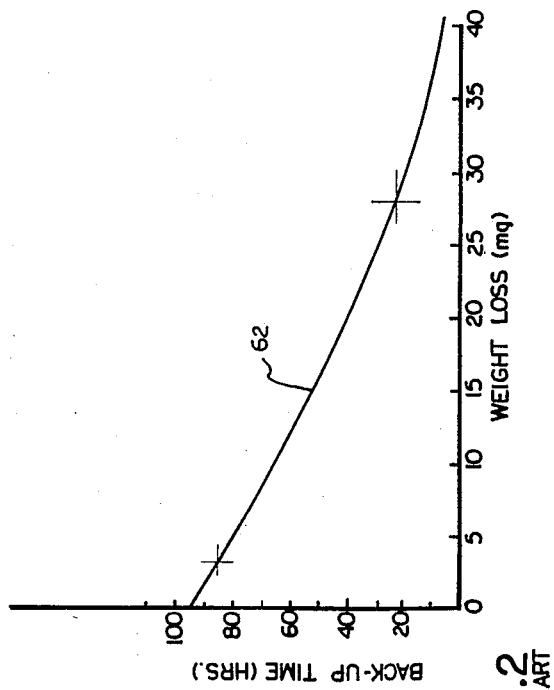

FIG. 2 shows a curve 62 of back-up time in hours versus the weight loss in milligrams. The back-up time is the time that the capacitor acted as a dc storage device to store energy, just like any other battery, for a small electrical load in the order of one microamp.

Figure 3:
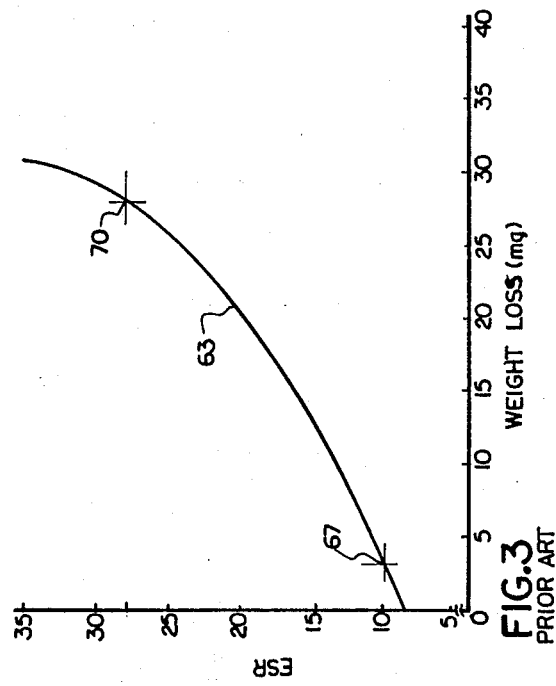

FIG. 3 shows a curve 63 of the equivalent series resistance in ohms versus weight loss in milligrams.

Figure 4:
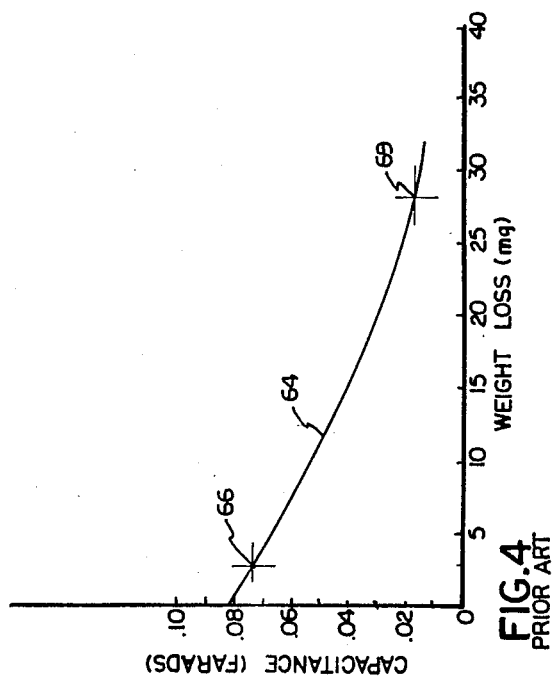

FIG. 4 shows a curve 64 of the capacitance in farads versus the weight loss in milligrams, and this curve 64 is quite similar in shape to the curve 62 of FIG. 2.

A comparison of the curves of FIGS. 1, 2, 3, and 4 illustrates the damaging result of loss of electrolyte. The curve 61 illustrates that a first 5% loss of electrolyte at point 65, which is principally loss of $H_2O$, may occur in about half a week and be a loss of about 2.75 milligrams. Curve 64 of FIG. 4 shows that for a 5% weight loss at point 66, there is about 8.75% loss of capacitance. Curve 63 of FIG. 3 shows that for 5% weight loss at point 67, there is about a 15.5% increase in the equivalent series resistance. This is set forth in Table 2.

TABLE 2

| Weight Loss % | Loss of C % | Increase of ESR % |
|---|---|---|
| 5 | 8.75 | 15.5 |
| 50 | 77.5 | 237 |

Since the curve 63 is non-linear, Table 2 shows the dramatic increase in equivalent series resistance when there is a 50% weight loss of electrolyte (point 68 in FIG. 1). This results in a loss of capacitance of about 77.5% (point 69 in FIG. 4) and 237% increase in the equivalent series resistance (point 70 in FIG. 3). The present invention inhibits this loss of electrolyte, and hence the capacitance is maintained throughout the service life of the unit 11 and the equivalent series resistance remains remarkably low.

The capacitor unit 11 may be assembled in a simple an expeditious manner. The individual capacitor cells 31 are individually constructed, as in the aforementioned U.S. patents which are incorporated herein by reference. The body 12 is formed in a conventional manner, typically by drawing, and the noble metal is affixed to the closed end base 14. This may be done by plating, rolling or coining. These two steps may be reversed if desired. The cap 15 is fabricated in a somewhat similar manner, usually by drawing, to form the cup-shape. The glass-to-metal seal 19 to the feed-through 18 is fabricated by conventional means. Each of these capacitor cells has an electron conducting outer surface or electrode, so that a stack of a plurality of these cells are all electronically connected in series. The insulator 22 is then placed on the electrode 21, and the lead-in 23 inserted through the feed-through 18 in the cap 15. The stack of capacitor cells 31 is then inserted into the insulator cup 22 with the optional conductive sponge 33. This subassembly is then inserted into the open end of the body 12. Also as an alternative construction, the flexible lead 58 is welded as at 59 to the electrode 26 and secured as by conductive cement 60 to the bottom of the stack 32. The flexible lead 58 is long enough to perform this cementing operation while the stack is outside the body 12, and then the lead may be curled or coiled into the nickel sponge 33 as the stack is inserted in the body 12. A predetermined force is placed upon the cap 15 to compress the capacitor cells 31. This compression force should be sufficient for good electrical conductivity from the electrodes through the nickel sponge 33 to the opposite ends of the stack 32. The cap 15 is then hermetically sealed to the body 12 and in the preferred embodiment, this may be by welding, for example, inert gas welding or laser welding, which will limit the heat conducted to the capacitor 11. A heat sink may surround the open end of the body 12 to limit such heat flow. The feed-through 18 is then crimped tightly onto the lead-in 23 and then the weld metal 52 welds the feed-through to the lead-in to complete this hermetic sealing of the entire capacitor unit 11. By this means, the capacitor unit is assembled which inhibits the loss of electrolyte from the capacitive body to less than 2% per year, and also limits the establishment of a spurious capacitor in series with the stack of capacitor cells, so that total farad capacity decreases less than 2% per year. The flexible lead 58 may also be connected between the electrode 21 and the upper end of the stack 32 for good electron conductivity, despite any high G forces to which the unit may be subjected, especially in military applications. It is desired that the unit be able to withstand very high forces, preferably up to 60,000 G. This bonded conductor 58 is designed to withstand such forces.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangements of parts and circuit elements may be resorted to without departing from the spirit and the scope of the invention as hereinafter claimed.

What is claimed is:

1. An extended life capacitor comprising, in combination:
    an enclosing body having an interior surface formed from a material highly resistance to corrosion by the electrolyte of the capacitor;
    a plurality of double layer capacitor cells inside said enclosing body and having first and second electron-conducting end members;
    said plurality of capacitor cells including a high surface area carbon material impregnated with an electrolyte;
    means providing electrical connection external to said body, mutually insulated, to said first and second end members of said plurality of capacitor cells as anode and cathode;
    means to inhibit the loss of electrolyte from the interior to the exterior of said capacitor body; and
    said inhibiting means including an hermetically sealed body and high purity components.

2. The extended life capacitor as set forth in claim 1, wherein said inhibiting means includes a body interior surface formed from tantalum or tantalum alloy.

3. The extended life capacitor as set forth in claim 1, wherein said inhibiting means inhibits the loss of electrolyte to less than 2% per year.

4. The extended life capacitor as set forth in claim 1, including means to limit the establishment of spurious capacitive means, by electrochemical action of the electrolyte at said cathode and anode, in series with said plurality of capacitor cells so that the total farad capacity decreases less than 2% per year.

5. The extended life capacitor as set forth in claim 4, wherein said limiting means includes a noble metal coating on at least part of the surface of the anode.

6. The extended life capacitor as set forth in claim 4, wherein said limiting means includes a noble metal coating on at least part of the surface of said cathode.

7. The extended life capacitor as set forth in claim 4, wherein said limiting means includes a gold coating on the surface of said anode.

8. The extended life capacitor of claim 7, wherein said limiting means further includes a gold coating on the surface of said cathode.

9. The extended life capacitor of claim 8, wherein the capacitor cells are conductive material with electrolyte therein containing about 36–40% by weight of sulfuric acid to water.

10. The extended life capacitor as set forth in claim 1, wherein said electrolyte is about 25–76% by weight of sulfuric acid to water.

11. The extended life capacitor as set forth in claim 1, wherein said electrolyte is about 36–40% by weight of sulfuric acid to water.

12. The extended life capacitor as set forth in claim 1, wherein said electrolyte is about 38% by weight of sulfuric acid to water.

13. The extended life capacitor as set forth in claim 1, wherein each of said capacitor cells includes a first and second electrode of activated carbon material impregnated with liquid electrolyte, and with a separator therebetween of a polysulfone material.

14. The extended life capacitor as set forth in claim 1, wherein said enclosing body is cylindrical and the inner surface of said cylindrical body is generally smooth.

15. The extended life capacitor as set forth in claim 14, wherein said smooth inner cylindrical surface is outside the electron conducting path of the entire capacitor.

16. An extended life capacitor comprising, in combination:
- a hollow body having an inner peripheral surface of tantalum and having an open end and a closed end base with at least a portion of an inner surface of a noble metal;
- a cap cooperable with the open end of said body and having an inner surface of tantalum;
- a lead-in through said cap and hermetically sealed thereto in an insulated manner;
- an electrode insulated from and disposed inside said cap and connected to said lead-in;
- a plurality of individual capacitor cells in a stack inside said body;
- said electrode having at least a portion of a face of a noble metal in electron conduction with one end of said stack;
- the other end of said stack being in electron conduction with said closed end base;
- a welded connection between said cap and said body to establish a hermetically sealed capacitor; and
- said capacitor cells including conductive material with electrolyte therein containing about 36–40% by weight sulfuric acid whereby the hermetic sealing and high purity of the components plus the noble metal assure a service life in excess of 10 years at a temperature range of $-55°$ C. to $+125°$ C.

17. The extended life capacitor as set forth in claim 16, wherein said electrode disposed inside said cap is a disc-shaped anode electrically connected to said lead-in.

18. The extended life capacitor as set forth in claim 16, including a conductive sponge between the closed end of said body and the respective end of said stack.

19. The extended life capacitor as set forth in claim 16, including means to limit the formation of a spurious capacitor element in series with said capacitor cells so that the total farad capacity decreases less than 2% per year.

20. The method of producing an extended life capacitor comprising:
- supplying a tantalum can with a hollow body having a closed end base and an opening at one end;
- plating at least a portion of the interior of the base which acts as an electrode;
- inserting a plurality of capacitor cells in the body in such a manner that they are electrically in series;
- each of said cells containing electrolyte;
- preparing a tantalum cover for the opening in the cylindrical body having a hermetically sealed feed-through therein;
- assembling an electrode in an insulated manner inside the tantalum cover with a lead for the electrode passing through the feed-through;
- pressing the cover on the can with a predetermined force to compress the capacitor cells for good electrical conductivity; and
- sealing the cover to the can to establish a hermetically sealed capacitor can whereby a capacitor is assembled which loses less than 2% per year of electrolyte.

21. The method of producing an extended life capacitor of claim 20, wherein at least a portion of the electrodes are coated with a noble metal prior to assembly.

22. The method of producing an extended life capacitor of claim 21, wherein the noble metal is gold.

23. The method of producing an extended life capacitor of claim 20, which further comprises the steps of inserting a conductive metal sponge cushion at the base prior to inserting a plurality of capacitor cells.

24. The method of producing an extended life capacitor of claim 23, wherein a conductive metal sponge cushion is inserted after the insertion of the capacitor cells and prior to attaching the cover.

25. The method of producing an extended life capacitor of claim 24, wherein the cover is welded to the tantalum can.

26. An extended life capacitor comprising in combination:
- a hollow body member formed from a material highly resistant to corrosion and having an open end and a closed end base with at least a portion of the inner surface of the closed end base having a coating of a noble metal to serve as an electrical contact region;
- a plurality of individual double layer capacitor cells stacked within said hollow body member;
- one end of said stacked double layer capacitor cells having electron conduction relation with said closed end base;
- a cap formed of material highly resistant to corrosion closing said open end of said hollow body member and hermetically sealed to said hollow body member;
- a conductive lead-in through said cap hermetically sealed thereto and insulated therefrom;
- an electrode within said hollow body member connected to said lead-in having an electrical contact portion thereof at least partially coated with a noble metal and having an electron conduction relation with the other end of said stacked double layer capacitor cells; and
- said double layer capacitor cells including activated carbon material and an electrolyte therein containing about 25–76 percent by weight sulfuric acid whereby the hermetic sealing, the purity of the components and the noble metal electrical contacts assure an extended service life.

27. The extended life capacitor of claim 26 wherein a first conductive metal sponge is positioned between said closed end base and the adjacent end of said stacked double layer capacitor cells and a second conductive metal sponge is positioned between said contact portions of said electrode and said other end of said stacked double layer capacitor cells, the metal sponges so positioned for absorbing shock and high acceleration and deceleration focus.

28. The extended life capacitor of claim 27 wherein said noble metal is gold.

* * * * *